US012679599B2

(12) United States Patent
Oberhausser et al.

(10) Patent No.: US 12,679,599 B2
(45) Date of Patent: Jul. 14, 2026

(54) REUSABLE ENVELOPE WITH PRE-CUT CLOSURE FLAP, METHOD AND MACHINE FOR MANUFATURING SUCH AN ENVELOPE

(71) Applicant: HOLWEG GROUP, Molsheim (FR)

(72) Inventors: Freddy Oberhausser, Strasbourg (FR); Marc Friederich, Herrlisheim (FR)

(73) Assignee: Holweg Group, Molsheim (FR)

(*) Notice: Subject to any disclaimer, the term of this patent is extended or adjusted under 35 U.S.C. 154(b) by 98 days.

(21) Appl. No.: 18/006,044

(22) PCT Filed: Jul. 16, 2021

(86) PCT No.: PCT/EP2021/070057
§ 371 (c)(1),
(2) Date: Jan. 19, 2023

(87) PCT Pub. No.: WO2022/023093
PCT Pub. Date: Feb. 3, 2022

(65) Prior Publication Data

US 2023/0312181 A1 Oct. 5, 2023

(30) Foreign Application Priority Data

Jul. 30, 2020 (FR) ........................................ 2008082

(51) Int. Cl.
*B31B 70/00* (2017.01)
*B31B 70/16* (2017.01)
(Continued)

(52) U.S. Cl.
CPC ............ *B65D 27/34* (2013.01); *B31B 70/005* (2017.08); *B31B 70/16* (2017.08); *B31B 70/62* (2017.08);
(Continued)

(58) Field of Classification Search
CPC ........ B65D 27/34; B65D 27/16; B65D 27/06; B65D 2401/35; B65D 2501/0054;
(Continued)

(56) References Cited

U.S. PATENT DOCUMENTS 2,153,848 A * 4/1939 Shea ........................ B31B 70/00
493/266
2,310,371 A * 2/1943 Lines ...................... B65D 27/34
206/455
(Continued)

FOREIGN PATENT DOCUMENTS

FR 786579 A 9/1935
FR 1270400 A 8/1961
(Continued)

OTHER PUBLICATIONS

18006044_2024-08-09_DE_102017102092_A1_M (Year: 2018).*
(Continued)

*Primary Examiner* — Shelley M Self
*Assistant Examiner* — Katie L Gerth
(74) *Attorney, Agent, or Firm* — Andrus Intellectual Property Law, LLP

(57) ABSTRACT

An envelope comprises a closure flap (14) for closing and opening (15) by folding over a first wall (11) of the envelope (1) and comprises, on an inner face (140), a first adhesive layer (141) protected by protection means (17) formed by a sheet, a second adhesive layer (142) protected by the protection means (17) and separated from the first adhesive layer (141) by a separation space (144), the flap (14) being pre-cut by a first and a second weakening line (181, 182) in the separation space (144), the sheet extending over the two adhesive layers (141, 142) and comprising a third weakening line (183) aligned with the first weakening line (181) and a fourth weakening line (184) aligned with the second
(Continued)

weakening line (182). Method and machine for manufacturing such an envelope.

4 Claims, 6 Drawing Sheets

(51) Int. Cl.
*B31B 70/62* (2017.01)
*B31B 150/00* (2017.01)
*B31B 160/10* (2017.01)
*B65D 27/16* (2006.01)
*B65D 27/34* (2006.01)

(52) U.S. Cl.
CPC ........ *B65D 27/16* (2013.01); *B31B 2150/002* (2017.08); *B31B 2160/102* (2017.08)

(58) Field of Classification Search
CPC .......... B65D 3/264; B65D 5/54; B65D 17/40; B65D 17/404; B65D 2571/00561; B31B 70/005; B31B 70/16; B31B 70/62; B31B 2150/002; B31B 2160/102; B31B 70/008; B31B 70/146; B31B 70/256; B31B 70/8122; Y02W 30/80
See application file for complete search history.

(56) References Cited

U.S. PATENT DOCUMENTS 3,114,299 A * 12/1963 Entzminger ............ B31B 70/16 493/266
3,203,323 A * 8/1965 Adams ................ B31B 70/8123 493/239
5,400,957 A * 3/1995 Stude ..................... B65D 27/34 229/303
5,478,302 A * 12/1995 Bluemle ................ B65D 31/08 493/263
5,503,328 A * 4/1996 Roccaforte ............ B65D 27/34 229/80
5,558,612 A * 9/1996 Blumle ................... B31B 70/52 493/183
5,776,285 A * 7/1998 Blumle ................... B31B 70/00 156/289
5,875,964 A * 3/1999 Pham ..................... B65D 27/06 229/303
5,950,916 A * 9/1999 Santangelo ............ B65D 27/06 229/301
6,032,854 A * 3/2000 Greer ..................... B65D 27/06 229/80
6,070,792 A * 6/2000 Foushee ................. B65D 27/06 229/80
6,435,404 B1 * 8/2002 Feick ..................... B65D 27/14 229/72
7,726,548 B2 * 6/2010 DeLaVergne .......... B65D 27/06 229/80
9,802,378 B2 * 10/2017 Thies ...................... B31B 70/00
2005/0173506 A1 * 8/2005 Bartlett .................. B65D 27/14 229/80
2014/0274636 A1 * 9/2014 Thies ...................... B31B 70/00 493/235
2018/0036987 A1 * 2/2018 Schalck ................ B31B 70/146
2018/0057234 A1 * 3/2018 Zhou ...................... B65D 75/30
2025/0065590 A1 * 2/2025 Ritondo .................. B31B 70/10

FOREIGN PATENT DOCUMENTS

GB 390455 11/1932
WO 2016097310 A1 6/2016

OTHER PUBLICATIONS

International Search Report issued in corresponding International PCT Application No. PCT/EP2021/070057; Mailing Date: Nov. 5, 2021.

* cited by examiner

[Fig. 1]
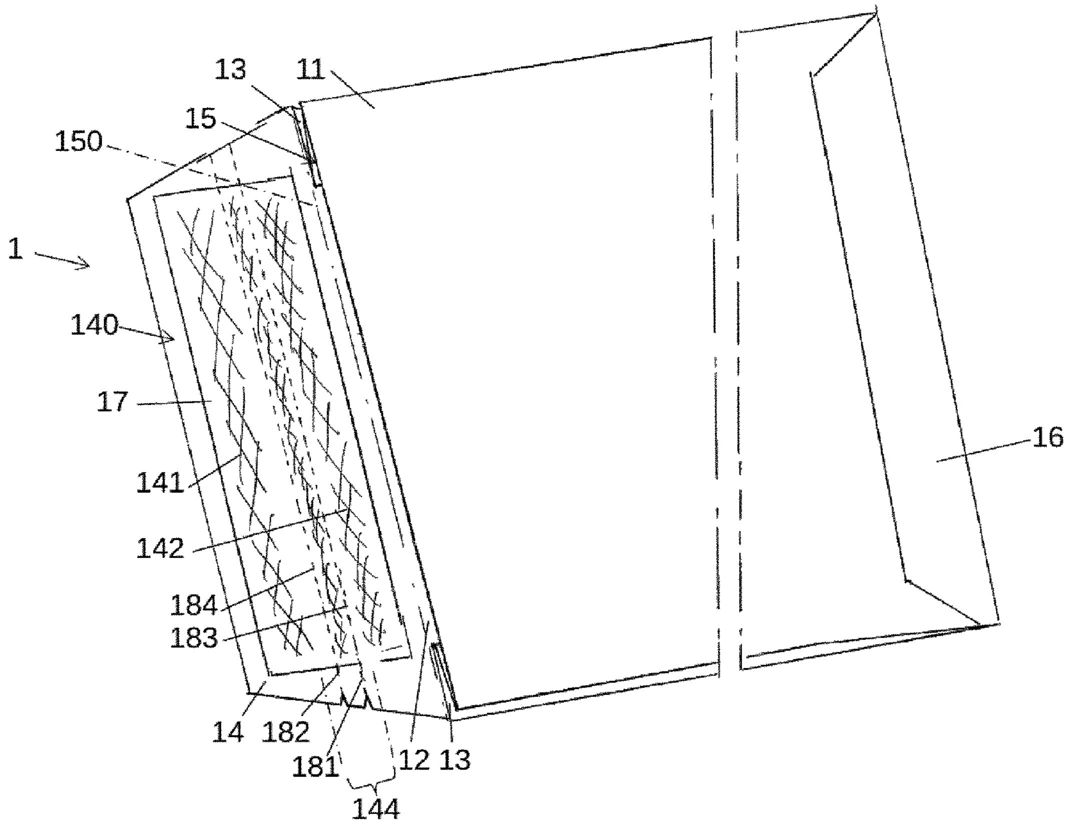
[Fig. 2]
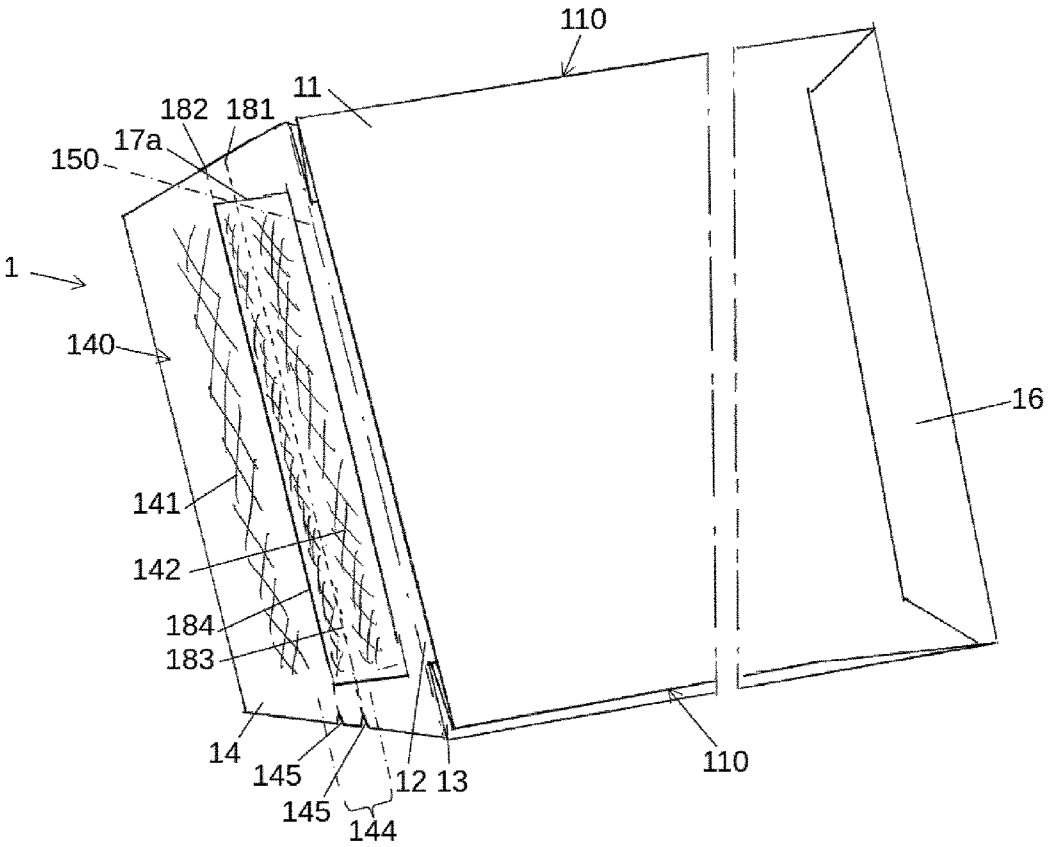

[Fig. 3]
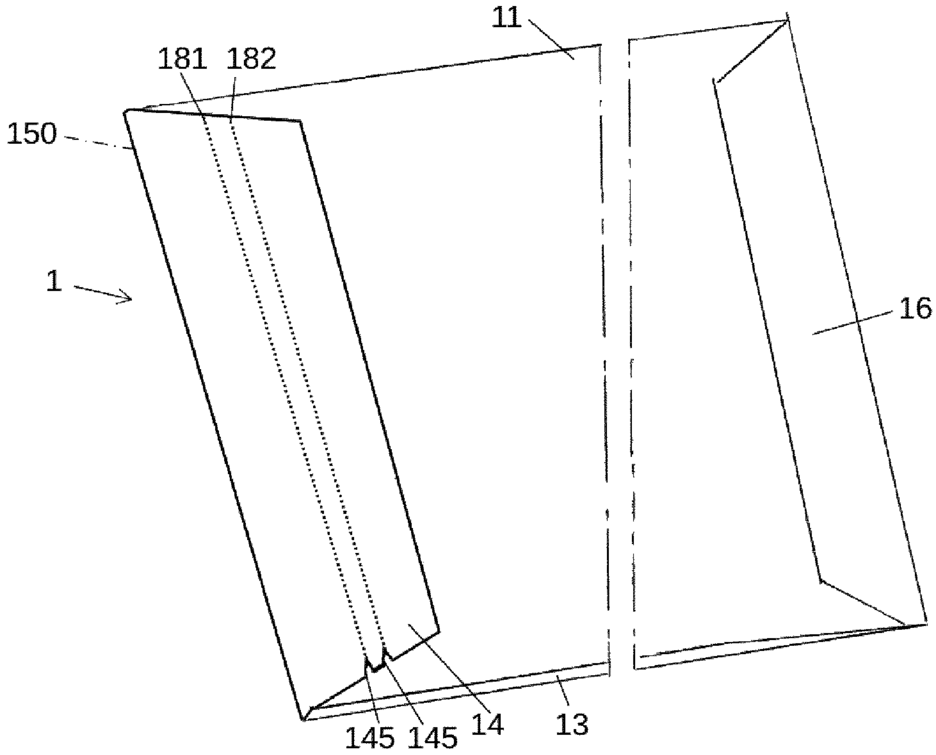
[Fig. 4]
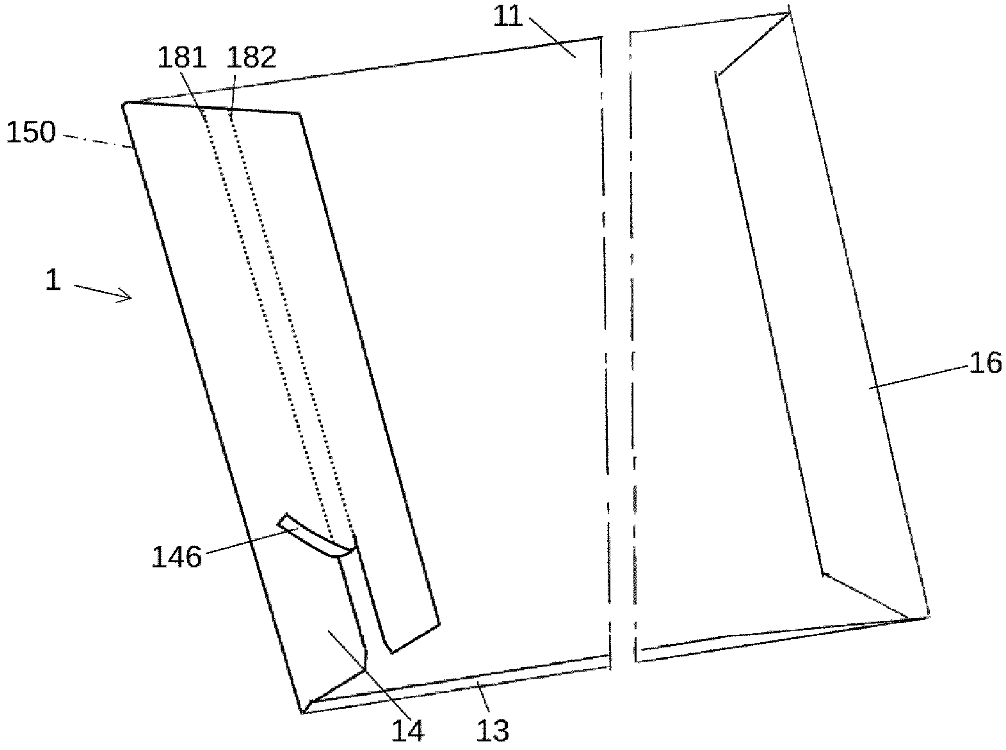

[Fig. 5]
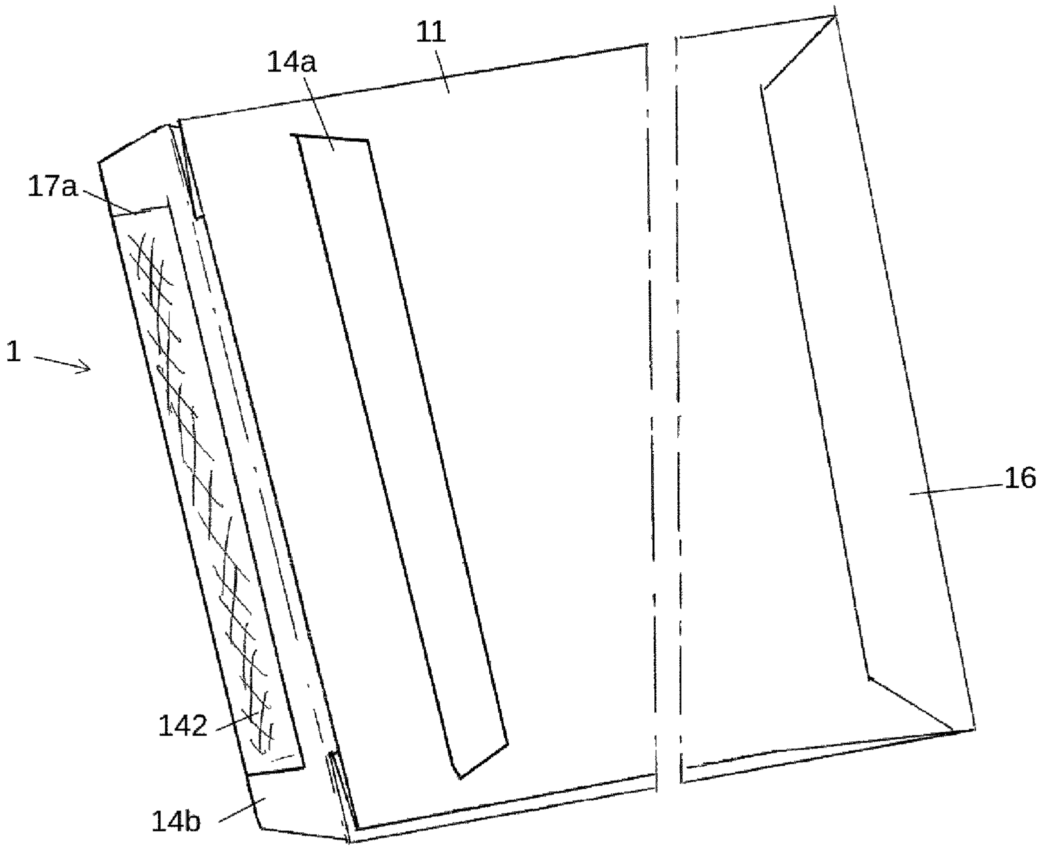

[Fig. 6]
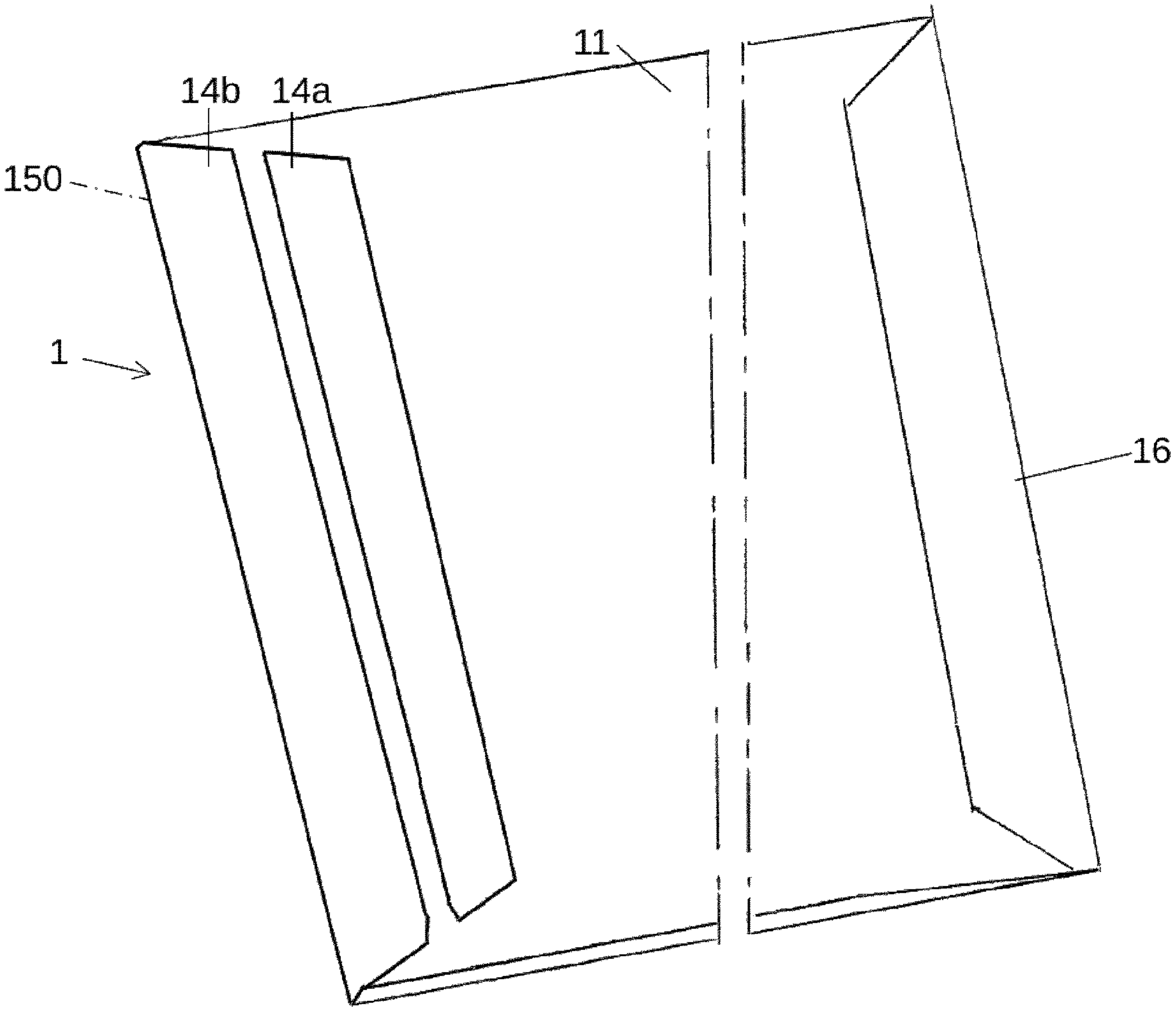

REUSABLE ENVELOPE WITH PRE-CUT CLOSURE FLAP, METHOD AND MACHINE FOR MANUFATURING SUCH AN ENVELOPE

CROSS-REFERENCE TO RELATED APPLICATIONS

This is a National Stage application of PCT international application PCT/EP2021/070057, filed on Jul. 16, 2021, which claims the priority of French Patent Application No. 2008082, filed Jul. 30, 2020, both of which are incorporated herein by reference in their entirety.

TECHNICAL FIELD

Abstract

A reusable envelope made, notably, of a flexible material such as paper. A method for manufacturing the envelope as well as a machine for manufacturing the envelope.

Prior Art

Industrial processes for manufacturing bags made of flexible materials such as paper or synthetic material have been known for a long time. For example, document FR 1 270 400 describes a machine and a process in which a strip is unreeled and formed into a tube. The tube is flattened in such a way that it comprises a first and a second wall, then the tube is cut into sections in such a way that at each end of the section there is a tab which prolongs the first or second wall. In a folding step, the tab is folded and bonded while being turned down on to the other wall than the one it extends from. It is thus possible to manufacture bags at a high rate with a large variety of materials and formats. Document FR 786 579 shows several examples of this technique. In particular, in FIGS. 4 to 6 it shows a manufacturing process in which the strip of paper includes transverse perforated lines at regular intervals, with a line at the center and two lines, axially offset with respect to the central line on each width of the strip.

The tube is formed by folding each edge over the central part and sticking two edges together along a central join in such a way that the central perforations form two transverse lines respectively offset on one and the other faces of the tube. The tube thus formed passes between a pair of drive rollers that drive the tube at a constant speed. The front part of the tube is gripped by the folding device which comprises a contra-rotary drum and folding roller. The drum and the folding roller rotate at a peripheral speed higher than that of the pair of drive rollers. The folding roller comprises a bar that is able to pinch the front of the tube against the drum, in such a way that the front part of the tube is pulled and separated by tearing along the perforations to form a section. On separation, owing to the offset between the lines of perforations, a rear tab is thus formed on the section, as well as a front tab at the end of the tube. This front tab will be situated on the next section. The front tab is folded by the folding device on to an adhesive-coated area to close the front part of the section. To achieve this, the roller also comprises a folding blade, just behind the bar, which pushes the tube into a pincher carried by the drum in such a way as to fold the tube.

In a variant, the tube is formed with gussets linking the first and second wall. Document WO 2016 097310 A1 shows an example of such bags. This document also shows a machine that is used to form an envelope from the tube using two stations each of which comprises a pair of contra-rotary cylinders whose work makes it possible to make the separation into sections and tear off a waste piece to reveal a tab at the front of the section on the same wall as the rear tab. Thus, after folding the tabs, they are applied to the same wall.

Such bags can be used as mail envelopes. In this case, the rear tab has an adhesive layer, for example protected by means of a protection such as a sheet of siliconized paper. This sheet can be removed, revealing the adhesive layer. The rear tab serves as a closure flap which can be folded to bring the adhesive layer against the wall opposite the one that the rear tab extends from, in such a way that the adhesive layer sticks to the wall, sealing the envelope. Thus, the wall that the tabs extend from has a smooth face when the tabs are stuck to the opposite face to close the envelope. When the envelope is received by its addressee, the latter tears the end of the envelope, for example at the level of the flap, to access the latter's content.

In order to make such an envelope, the process such as described above is modified to include the placement of the adhesive layer and of the protection means on the adhesive layer before the formation of the tube. The position of the placement is adjusted in such a way that the protection means is uncovered on the rear tab at the time of the separation of the sections. Document GB 390,455 shows a process for applying a transparent window on to a strip of paper before the formation of an envelope. This same technique is used to place the protection means on an adhesive layer deposited beforehand.

Such an envelope can only be used once. However, it is increasingly frequent—in particular for mail-order or internet commerce—that the initial addressee wishes to return the article they have received. In this case they must obtain another envelope.

An envelope is proposed in document U.S. Pat. No. 5,503,328 that can be used more than once. To achieve this, the flap comprises two adhesive layers separated by a separation space. Each adhesive layer is protected by a protection sheet. The separation space receives a tear-off strip. When sent for the first time, the sheet protecting the outermost adhesive layer is removed and the flap is turned down so that the adhesive layer sticks to the envelope, in order to close it. To open it, the addressee pulls on the tear-off strip in such a way that the flap is torn at the level of the separation space. The addressee can therefore reuse the envelope by removing the second protection sheet and folding down the remaining part of the flap so that the second adhesive layer sticks to the envelope to close it.

Although this is satisfactory, this envelope is complicated to manufacture. In particular, the placement of the tear-off strip, which is made of a resistant material, is done by unreeling the strip, which means that the flap must be parallel to the movement direction when making the envelopes. The production rates of this type are lower than those for envelopes with the process in document WO 2016 097310 A1.

OBJECT OF THE INVENTION

It is therefore one goal of the invention to propose an envelope that can be reused while being produced at a high rate.

With these goals in view, the object of the invention is an envelope comprising an opening and a closure flap to close the opening, the closure flap being foldable on to a first wall of the envelope and comprising on an inside face a first adhesive layer protected by a means of a protection, a second adhesive layer protected by the means of a protection and separated from the first adhesive layer by a separation space, the flap being pre-cut by a first and a second weakening line in the separation space, characterised by the fact that the protection means is formed by a sheet extending over both adhesive layers, the sheet comprising a third weakening line aligned with the first weakening line and a fourth weakening line aligned with the second weakening line.

Such an envelope is reusable given that the flap can be closed for the first time by removing the protection sheet to reveal the first adhesive layer and stick the first adhesive layer to the first wall, the envelope can then be opened by tearing the strip of material delimited between the first and second weakening line and the part of the sheet situated between the third and fourth lines. Lastly, the envelope can be closed a second time by revealing the second adhesive layer by removing the remainder of the sheet so it can be stuck on to the first wall. Such an envelope can be produced in a productive way while being completely produced continuously and without reworking. The protection sheet is sufficiently wide to be positioned in one movement in its transverse direction, as will be shown subsequently.

As per an improvement, the sheet and the flap are stuck between the weakening lines. The tearing off of the strip being done more assuredly owing to the cohesion of the part extending from the flap and the part extending from the sheet.

As per one accomplishment mode, the weakening lines are lines of perforations. The size of the perforations and the space between them can be adjusted in such a way as to adjust the weakening of the strip of material.

As per another accomplishment mode, the weakening lines are lines pre-cut in the thickness. Such lines are made by pressing the flap with a fine blade against a hard surface without passing through the whole thickness. Tearing is then guided along that weakening line when tearing off the strip.

As per a disposition, the envelope comprises a second wall, from which the flap extends, that is connected to the first wall along the outer edges of the first wall. The link between first and second walls is ensured by the fact the strip of material is folded between the two, which makes a strong link.

In a special way, the first and second walls are linked by gussets extending along the outer edges. The gussets also extend from the same strip of material by making folds. The envelope can contain a thick content while being strong.

As per an improvement, the flap comprises an incision in at least one of the ends of at least one of the weakening lines. The incision thus initiates the tearing of the strip.

Another object of the invention is a manufacturing process for an envelope such as described above, whereby a closure flap is formed in the prolongation of the second wall of the envelope, two coats of adhesive are positioned on the flap parallel to each other and separated by a separation space, characterised by the fact a sheet is positioned forming a protection means on both adhesive layers, the sheet and flap are weakened together to make a first weakening line in the flap's separation space aligned with a third perforation line in the sheet, and a second perforation line in the flap's separation space aligned with a fourth weakening line in the sheet, the weakening lines extending in parallel in the separation space. The weakening lines are made together and their alignment is therefore guaranteed.

As per one accomplishment mode, the envelope is formed from a strip of flexible material on which firstly adhesive layers and the protection sheet are positioned, then the strip is closed to form a tube by joining the widths of the strip, then the tube is separated into sections leaving the flap at a first end of the section, each section forming an envelope after a second end, opposite the first end, has been closed. This process is a modification of a conventional envelope manufacturing process, whereby a protection means and the adhesive layers are added before the tube is formed.

In a special way, the weakening lines are made after the separation of the tube into sections.

As per another accomplishment mode, the envelope is formed from a strip of flexible material closed to make a tube by joining the widths of the strip, then the tube is separated into sections leaving the flap at a first end of the section, each section forming an envelope after a second end, opposite the first end, has been closed, flap on which adhesive layers, the protection sheet and adhesive layers are positioned and the weakening lines are made. This process is a modification of a conventional envelope manufacturing process in which the protection means and adhesive layers are added after the formation of the envelope or of an initial version of the envelope.

The object of the invention is also a machine for manufacturing an envelope implementing a process such as described above, the machine comprising a tube forming device to form a tube from a strip of flexible material, a separation device for separating a section of the tube at the front of the tube while forming a closure flap at one end of the tube section, the flap prolonging the section beyond the end of a first wall, the machine being characterised by the fact it includes the first means of placement for positioning two adhesive layers parallel to each other on the strip of material, and separated by a separation space at the level of the closure flap, the means of placement being designed to also position a sheet forming the protection means on both adhesive layers, the machine also comprising means of weakening for making together a first weakening line and a third weakening line respectively on the flap and the aligned sheet and in the flap separation space, and together a second weakening line in the flap separation space aligned with a fourth line of the sheet, the weakening lines extending in parallel in the separation space.

As per one accomplishment mode, the placement means is situated upstream of the tube formation device. The means of placement can thus be inserted upstream of the tube formation device, for example by a block that has its own frame.

As per another accomplishment mode, the placement means is situated downstream of the tube separation device. The placement means can be inserted on the same frame as the separation device, which avoids having to provide a specific frame.

As per a constructive disposition, the means of weakening is situated downstream of the tube separation device and the placement means.

As per a constructive disposition, the machine comprises a base formation device for forming the envelope with each tube section by closing the front of the tube section.

BRIEF DESCRIPTION OF THE DRAWINGS

The invention will be better understood and other special features and advantages will be revealed by reading the description below, the description referring to the appended drawings among which:

FIG. 1 is a perspective view of an envelope conforming to one of the invention's accomplishment modes;

FIG. 2 gives a view similar to FIG. 1 of the envelope ready to be closed for the first time;

FIG. 3 gives a view similar to FIG. 1 of the envelope closed for the first time;

FIG. 4 gives a view similar to FIG. 1 of the envelope being opened;

FIG. 5 gives a view similar to FIG. 1 of the envelope ready to be closed for the second time;

FIG. 6 gives a view similar to FIG. 1 of the envelope closed for the second time;

DESCRIPTION OF THE ACCOMPLISHMENTS MODES

Figure 7:
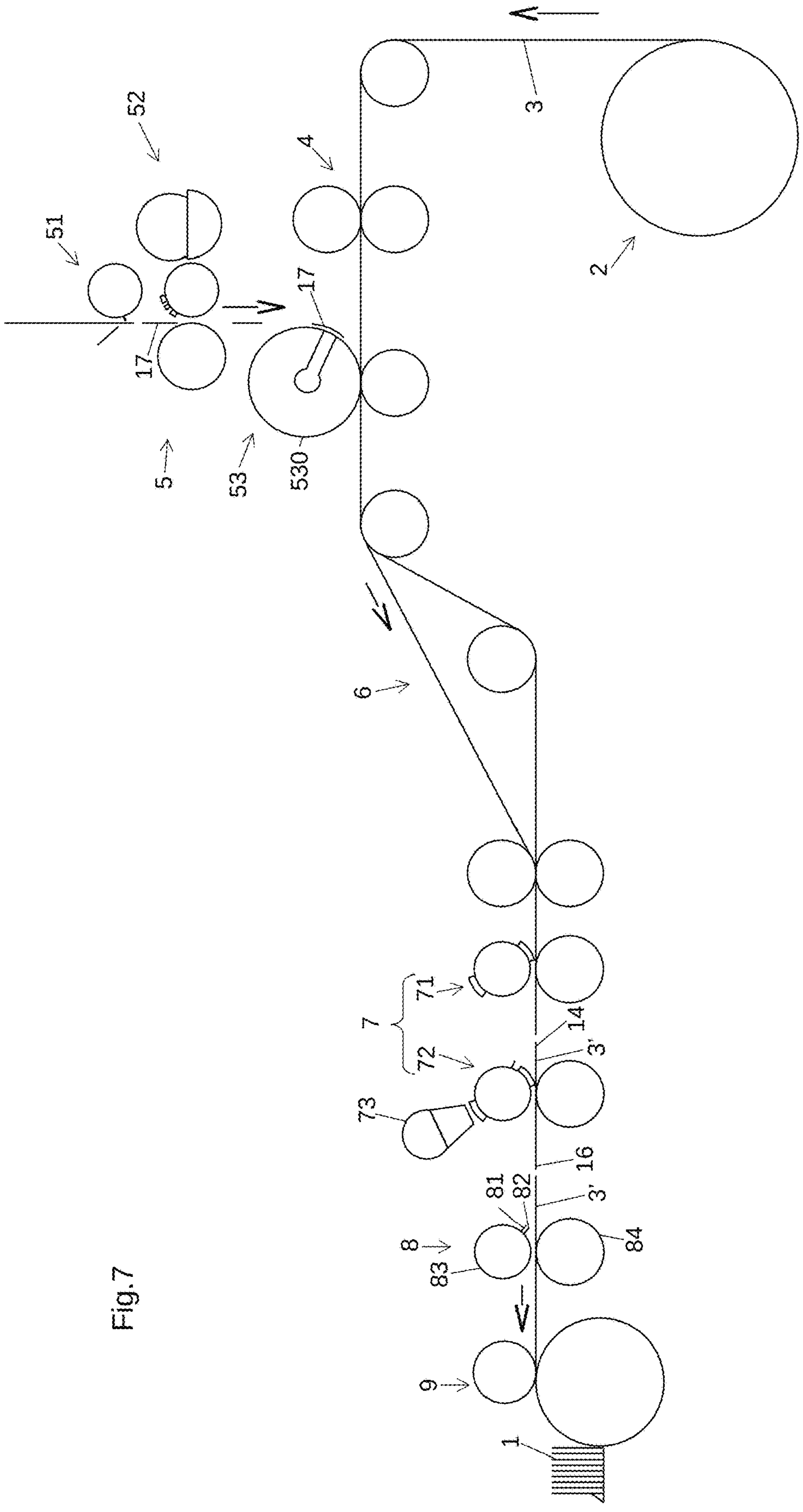
FIG. 7 gives a schematic view of the envelope manufacturing machine of FIG. 1 as per a first accomplishment mode.

An envelope 1 conforming to the invention's accomplishment mode is shown in FIGS. 1 to 6. The envelope is made of a flexible material such as paper or a woven synthetic material or non-woven textile. Envelope 1 comprises a first wall 11 and a second wall 12 superimposed and linked by gussets 13 extending along the outer edges 110. Envelope 1 comprises a closure flap 14 extending from the second wall 12 and which extends beyond an opening 15 in envelope 1 delimited between walls 11, 12 and gussets 13. Opposite flap 14, envelope 1 comprises a tab 16 extending from the second wall 12, folded on to the first wall 11 and stuck to it to form a base. Envelope 1 can be closed by folding closure flap 14 along a flap line 150 extending along the opening 15 and separating closure flap 14 from the second wall 12, then by turning down flap 14 on to the first wall as detailed below.

Closure flap 14 comprises on an inner face 140 a first adhesive layer 141 extending in parallel with the line on flap 14 and a second adhesive layer 142 extending in parallel with the line on flap 14 between said line and the first adhesive layer 141. The first and second adhesive layers 141, 142 are separated by a separation space 144. A sheet 17 forming a protection means covers the first adhesive layer 141 and the second adhesive layer 142 to protect them. Sheet 17 is for example made of siliconized paper.

Flap 14 is pre-cut with a first and second weakening line 181, 182 in the separation space 144, likewise sheet 17 which comprises a third weakening line 183 aligned with the first weakening line 181 and a fourth weakening line 184 aligned with the second weakening line 182. A third adhesive layer covers the separation space 144 between the weakening lines to stick sheet 17 and flap 14 between them between the weakening lines 181, 182, 183, 184. In the example shown, the weakening lines 181, 182, 183, 184 are lines of perforations. Flap 14 comprises an incision 145 at one end of the first and of the second weakening lines 181, 182.

When using such an envelope 1, a user inserts a content, not shown, into the envelope 1 through opening 15, then removes the sheet 17 that covers the first adhesive layer 141 by tearing it along the fourth weakening line 184, as shown in FIG. 2, leaving part **17*a* of the sheet in place. They turn down flap 14 by folding along the line of flap 14 and press the first adhesive layer 141 on to the first wall 11 in order to stick flap 14 to it. Envelope 1 is then closed, as shown in FIG. 3**, and can be sent.

When they receive envelope 1, the addressee pulls on the entity formed by the part of flap 14 situated between weakening lines 181, 182 and the corresponding part of sheet 17. To do this, they are assisted by the incisions 145 which delimit a tear initiation. The part that is removed forms a strip 146 that separates flap 14 into two parts **14*a*, 14*b*, as shown in FIG. 4, one 14*a* which remains stuck to the first wall 11, and another part 14*b* which opens and releases opening 15, as shown in FIG. 5**.

Envelope 1 can be re-used by the addressee. To do this, they remove the rest of sheet **17*a* to release the second adhesive layer 142, fold flap 14 along the line of flap 150 and press the second adhesive layer 142 on to the first wall 11 in order to stick flap part 14*b* to it, as shown in FIG. 6**.

Alternatively, the weakening lines may be lines pre-cut in the thickness of flap 14 and of sheet 17.

In order to manufacture an envelope 1 such as described above, a machine, such as outlined in FIG. 7, can be used. Such a machine successively comprises an unwinding device 2 in the unwinding direction to unwind a strip 3 of flexible material such as a roll of paper to unwind it, means of perforation 4 for making perforations transversally on strip 3 of material, means of placement 5, a tube formation device 6 for forming a tube from the strip 3 of material, a separation device 7 for separating a section 3' from the tube at the front while forming closure flap 14 at the rear end of tube section 3', weakening means 8 and a base formation device 9 for forming envelope 1 with each tube section 3' by closing the front of tube section 3'. The envelopes 1 formed are stacked at the output from the base formation device 9.

The tube formation device 6 is a conventional device and will not be described in greater detail. The separation device 7 comprises a gripping station 71 and a tearing station 72 such as described in document WO 2016/097310 A1. The functioning of this separation device 7 is not described here, except that it makes it possible to deliver to the weakening means 8 tube sections 3' comprising a tab 16 at the front of section 3', which will then make it possible to form the base of envelope 1, and flap 14 at the rear of section 3', the second wall 12 being situated in the lower part. A waste piece, not shown, is extracted from the tube by tearing station 72 and suction means 73 to uncover flap 14.

The base formation device 9 is a conventional device and will not be described in greater detail. It is used to fold and stick the tab 16 to close the envelope.

The placement means 5 is designed to place the first, second and third adhesive layer 141, 142, 143 on the strip 3 of material and cover them with sheet 17 at the level of what will become closure flap 14. To do this, sheet 17 arrives continuously, is cut by a cutting station 51 and receives the adhesive layers in a bonding station 52. It is then taken in a transfer station 53 which sucks it on to the surface of a roller 530 and presses on the strip 3 of material to place the sheet 17 and the adhesive layers 141, 142, 143. The face of sheet 17 in contact with adhesive layers 141, 142, 143 is siliconized in such a way that the sheet 17 can then be extracted whereas the adhesive layer 141, 142, 143 remains on the strip 3 of material.

The weakening means 8 comprises two notched blades 81, 82 protruding from a roller 83 and a counter-roller 84 comprising a soft surface. By gripping the flap 14 of tube section 3' between the roller 83 and counter-roller 84, the first weakening line 181 and the third weakening line 183 are made respectively on the aligned flap 14 and sheet 17 and in the separation space 144 of flap 14, and the second weakening line 182 is made in the separation space 144 of flap 14 aligned with the fourth weakening line 184 of sheet 17, the weakening lines having the shape of lines of perforations.

Figure 8:
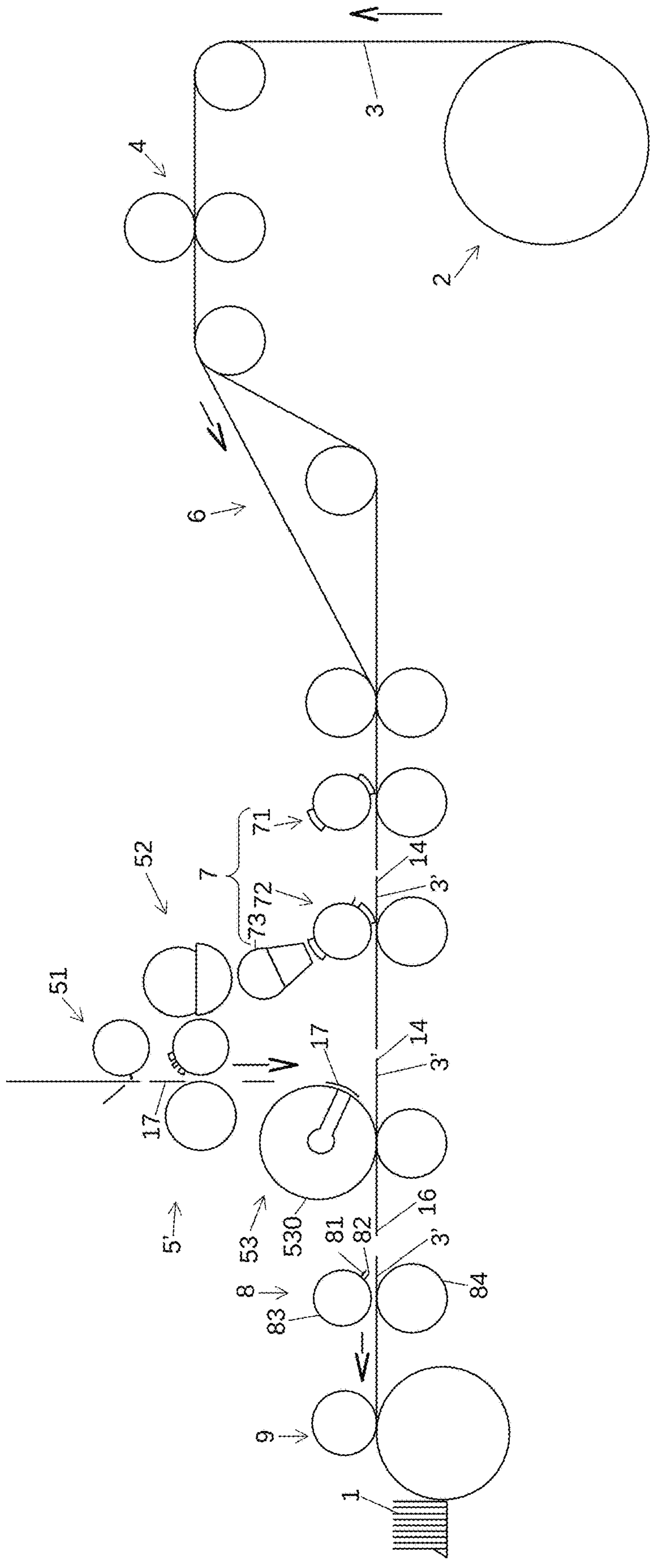
FIG. 8 gives a schematic view of the envelope manufacturing machine of FIG. 1 as per a second accomplishment mode.

In a second accomplishment mode, the machine, such as shown in FIG. 8, is distinguished from the first accomplishment mode in that the placement means 5' is situated downstream of the tube separation device 7 and upstream of weakening means 8.

The invention is not limited to the accomplishment modes that have just been described simply as an example. The envelopes can be made without gussets, that is to say that the first wall and the second wall are connected to each other by a simple fold along the outer edges. The weakening means can be placed between the placement means and the tube formation means.

What is claimed is:

1. A method for manufacturing an envelope, the method comprising:

forming a closure flap in a wall of the envelope;

placing two adhesive layers on the closure flap that extend parallel to each other and are separated from each other by a separation space;

placing a sheet on the two adhesive layers to form a protection means;

forming a first weakening line in the separation space on the closure flap and a third weakening line in the sheet, wherein the first weakening line and the third weakening line are formed together such that the first weakening line is aligned with the third weakening line;

forming a second weakening line in the separation space on the closure flap and a fourth weakening line in the sheet, wherein the second weakening line and the fourth weakening line are formed together such that the second weakening line is aligned with the fourth weakening line; and wherein the first weakening line and the fourth weakening line are spaced apart and extend parallel to each other in the separation space.

2. The method according to claim 1, further comprising:

forming the envelope from a strip of flexible material on which the adhesive layers and the sheet are placed;

closing the strip to form a tube by joining widths of the strip; and separating the tube into a plurality of sections leaving the closure flap at a first end of each section of the plurality of sections, wherein each section forms an envelope after closing of a second end of each section opposite the first end of each section.

3. The method according to claim 2, wherein the weakening lines are formed after separating the tube into the plurality of sections.

4. The method according to claim 1, further comprising:

forming the envelope from a strip of flexible material which closed to form a tube by joining widths of the strip; and separating the tube into a plurality of sections leaving the closure flap at a first end of each section, wherein each section in the plurality of sections forms an envelope after closing of a second end of each section opposite the first end of each section; and wherein the adhesive layers and the sheet are placed and the weakening lines are formed after separating the tube into the plurality of sections.

* * * * *